No. 771,512.

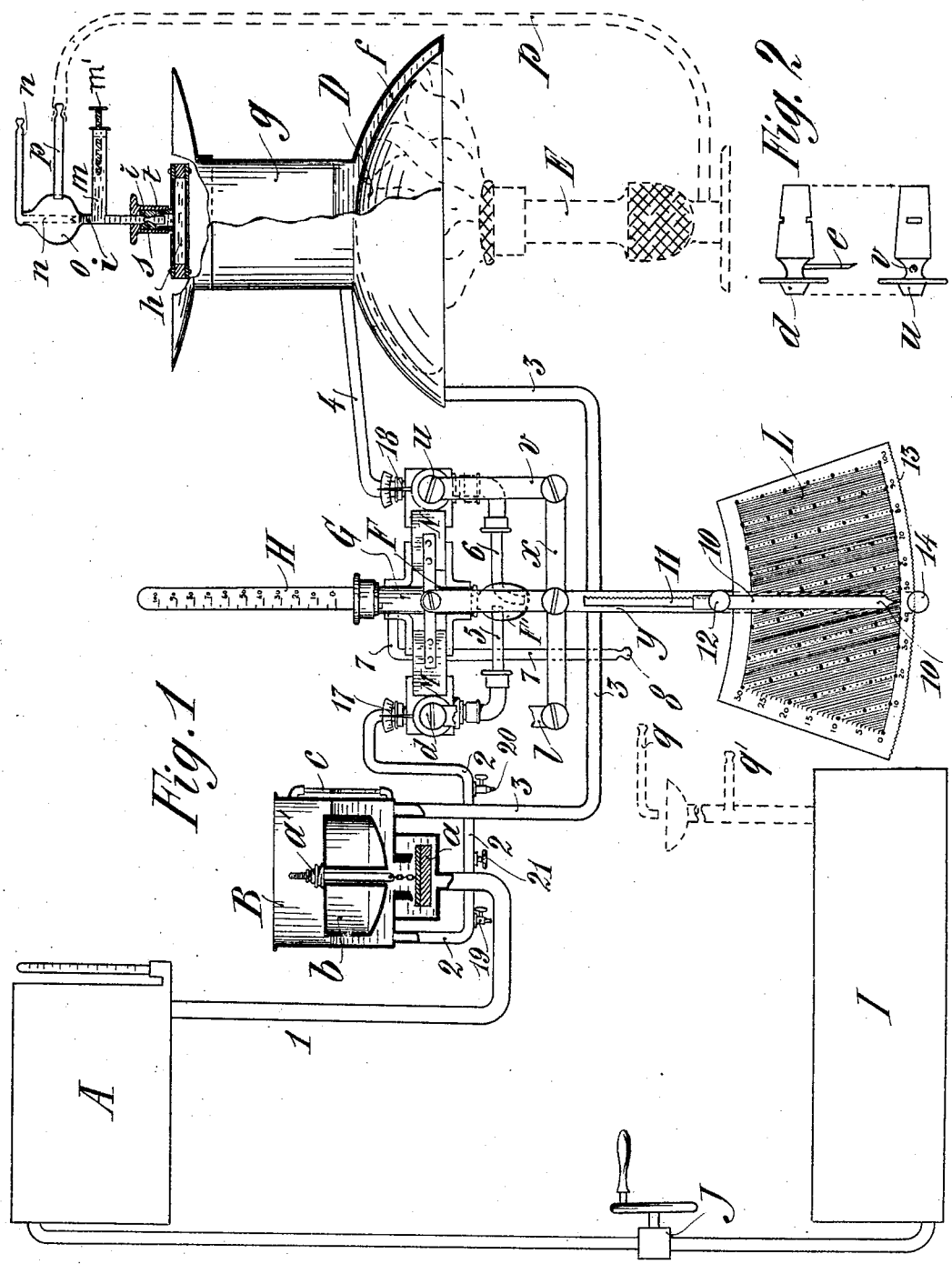

Patented October 4, 1904.

UNITED STATES PATENT OFFICE.

MARCO TREVES, OF TURIN, ITALY.

MEANS FOR OBTAINING LIQUID AT A DESIRED TEMPERATURE.

SPECIFICATION forming part of Letters Patent No. 771,512, dated October 4, 1904.

Application filed January 13, 1904. Serial No. 188,889. (No model.)

*To all whom it may concern:*

Be it known that I, MARCO TREVES, doctor and surgeon, a subject of the King of Italy, residing at 22 Via Giulio, in the city of Turin, Province of Turin, Italy, have invented certain new and useful Improvements in Means for Obtaining Liquid at a Desired Temperature; and I do hereby declare the following to be a full, clear, and exact description of the invention, such as will enable others skilled in the art to which it appertains to make and use the same.

My invention relates to apparatus for obtaining water or other liquids at any desired temperature between two predetermined or fixed degrees or limits, a pointer or index connected with the organs of delivery of the liquids being brought for this purpose by the operator to correspond to a point of a graduated scale wherein the desired temperature is inscribed.

The general construction of the apparatus comprises a continuous supply of water or other liquid which parts at a certain point into two branches, one of them passing through a boiler, where the liquid is brought to its boiling-point, and the other passing, if necessary, through a refrigerator. Then the two branches lead to a mixing-chamber through passages controlled simultaneously and inversely by hand and connected to an index or pointer sliding over a graduated scale, so that the respective proportions of the cold and warm liquid in the mixing-chamber depend upon the position of the pointer or index upon the scale, and the temperature of the liquid delivered from the mixing-chamber corresponds to the indication shown by the pointer or index upon the scale. I am aware that apparatus of said general construction are known and have been constructed in several forms before now, and I do not intend to make any general claim in this respect.

My invention has for its chief object some improvements whereby the operation of the apparatus does not require the bringing of the liquid in the cold branch to a constant predetermined low temperature, so that in most cases the refrigerator can be dispensed with, this being obtained principally by the combination of a pointer or index capable of sliding in its axial direction with a specially-designed graduated scale.

Other improvements consist specially in the adoption of heat-insulating blocks and air-passages between the cold and warm branches, to the end of preventing transmission of heat from one to the other and from each of them to the mixing-chamber, and other improvements are designed to obtain a working of the apparatus easier, more economical, and more exact and reliable than was heretofore obtainable with the old apparatus.

My invention is illustrated in the accompanying drawings, in which—

Figure 1 represents diagrammatically the construction of an apparatus in conformity with my invention, and Fig. 2 shows a detail.

A is a container wherefrom the liquid passes to the pipe 1, or the pipe 1 may be connected to a larger canalization direct, and thence to the chamber B through a valve $a$, controlled by a float $b$, so that the level of the liquid, which is rendered visible from the outside by a level-indicator $c$, is maintained constant in the chamber B. From B start two branch pipes 2 and 3, the former of which leads directly to a cock $d$, controlled by a handle $l$. The second pipe 3 leads to the bottom of a boiler D, which is represented as comprising a lower portion $f$, where the liquid occupies the narrow space between two spherical surfaces very near one to the other, so that the heat developed by the burner E is readily transmitted to the liquid, raising its temperature to the boiling-point. Above the portion $f$ is a tubular chamber $g$, in which the liquid rises to the constant level of the chamber B. The burner may be an alcohol or benzene or a similar liquid burner; but I prefer using a gas-burner, as shown. In this case I apply to the top of the boiler D a gas-controller to control the admission of the gas to the burner E. Said gas-controller consists of a relatively wide chamber $h$, exposed to the vapors emanating from the boiler D. Chamber $h$ communicates with a pipe $i$, having a branch pipe $m$, and ending with an expansion-chamber $o$, from which depart two other pipes $p$ $n$, arranged as shown in the drawings. Pipe $n$ comes from the gas-supply, and pipe $p$ leads to the burner. Having conveniently filled with mercury chamber $h$ and pipe $i$ and exactly regulated its level by plunging more or less in the same the stem of a screw $m'$ in the branch pipe $m$, so as to make said level nearly flush with the lower opening of pipe $n$ in the expansion $o$, the device is ready to control the admission of the gas to the burner E. When the vapors emanate from the boiler D in a very large quantity, the mercury in the chamber $h$ expands and rises in the pipe $i$, obstructing the passage of the gas from the admission-pipe $n$ to the delivery-pipe $p$, leading to the burner E. Gas-controllers of this kind are, generally speaking, known, but not in combination with the other parts of the apparatus. I consider, however, as a part of my invention the connection between the pipe $i$, which is generally a glass pipe, and the chamber $h$, which is a metallic chamber. Said connection comprises a contracted portion $r$ of the pipe $i$, around which is a packing, preferably of asbestos, $s$, pressed downward by a screw-head $t$, engaged with a corresponding screwed pipe projecting from the upper wall of chamber $h$. Said connection is readily made and is quite safe and convenient.

The boiler D is open to the atmosphere. An exit-pipe 4 leads from a point of $q$ a little lower than the liquid-level to a cock $u$, controlled by a handle $v$. Handles $l$ and $v$ are connected through a connecting-rod $x$, the latter being connected in its central point to a lever $y$, pivoted to a fixed point at F. The plugs of the cocks $d$ and $u$ are inversely connected to their respective handles $e v$, as shown at Fig. 2, so that by moving the lever $y$ in one or the other direction the passages through the cocks $d$ and $u$ are reciprocally opened or closed exactly in the same proportion. Through the passages in said cocks the liquid is respectively led from the pipes 2 and 4 to the pipes 5 and 6 and through the latter to the mixing-chamber F'. Thence the liquid rises to a chamber G, where the bulb of a thermometer H is plunged, and from the same, through pipe 7, is led to the exit 8. Generally the liquid is utilized through a rubber cushion or similar object, which is applied for therapeutical purposes to the body or a sick member of the patient. In such cases the inlet-pipe of the cushion is connected to 8 and the exit-pipe is connected to $q$ or, if a suction from the liquid is desired, to $q'$, so that the liquid falls in the recipient I, from which when it is of a costly nature—such as, for instance, distilled water—it is returned to the reservoir A by means of a pump J.

The handle $y$, whereby the cocks $d$ and $u$ are operated, carries an index or pointer 10, which can be made to slide longitudinally by means of a rack-and-pinion device by the rotation of a button 12, so that the indicating end of the index is capable of a displacement corresponding to the full width of the diagram or graduated scale L. Another ratchet-and-wheel device 13, connected to the handle $y$ and the scale L, permits the operator to swing the handle $y$ by rotating the button 14 to any angular position above the scale L, so that the apex of the pointer 10 can be made to coincide at will with any point of the graduated scale or tablet L.

The graduated scale or diagram or tablet L is obtained as hereinafter explained.

If we suppose to rotate the button 14 so far as to carry the handle $y$ to its extreme position to the left, we close entirely by so doing the admission to the warm water and open entirely the same to the cold water. The water coming out from 8 will have the temperature of the cold supply, a temperature which will be read on the thermometer H. We will then inscribe upon the scale L at the point coincident with the index said temperature. If now we rotate the handle $y$ to the extreme opposite position, only the warm liquid will flow through the apparatus, so that the constant temperature of the boiler D will be read on the thermometer H, which temperature we will inscribe on the scale L in correspondence with the index 10. Now if we consider the line described by the index 10, which we suppose was not allowed to slide axially on the handle $y$, we see that the same is a portion of a circle having its center at F. By dividing said portion of circle into as many parts as there are degrees between the extreme temperatures of the cold liquid and the boiling liquid we obtain such a graduated line that by bringing the pointer 10 to coincide with any of its graduations we obtain from the exit 8 a flow of liquid at the temperature indicated by the graduation shown by the index. If now we suppose that the temperature of the water-supply be higher or lower, we can make a similar graduation above or below the graduation now obtained by displacing the pointer 10 radially a certain distance, so that new graduations will be added to the tablet L. Such operation can be repeated for all possible temperatures of the cold supply, and it is easily understood that the tablets will have the appearance as shown in the drawings, where there appears a series of isothermal lines nearly parallel to each other, for the reason that all of them have approximately the inclination of the radius corresponding to the extreme position of the handle $y$ to the right. Such radius is, in fact, the isothermal line corresponding to the boiling temperature of the liquid. It is obvious that it is not necessary in practice to construct the tablets in the manner above described for explaining the theory. In fact, when it is known the maximum angle of displacement of the handle $y$ and the length of the axial displacement of the pointer the tablet can be easily made with the ordinary drafting means.

The apparatus is employed in the following manner: The first thing to do is to ascertain the temperature of the cold supply, which is done by carrying the handle $y$ to its extreme position to the left and then reading the temperature on the thermometer. If the temperature is, for instance, 15°, the operator makes then the pointer to slide axially on the handle until it reaches the line on the tablet marking the temperature of 15°. The apparatus is now ready for operation, and liquid of any desired temperature can be obtained by merely rotating the handle $y$ until the pointer reaches the line of the tablet marking the desired temperature. If lower temperatures are desired than that of the cold liquid-supply, then a refrigerator can be inserted between said supply and its delivery-cock—for instance, from the cock 19 to the cock 20—after closing the intermediate cock 21. It is to be noted that as the boiling-point of the liquid varies with the pressure of the air so it is convenient to have for each apparatus a set of tablets or diagrams, such as L, each arranged for a given pressure of the air, so that before employing the apparatus the diagram or tablet corresponding to the pressure read on any convenient barometer will be applied to the instrument. It being very important to control the pressure of the liquid in the apparatus, such pressure can be exactly controlled by operating the nut $a'$ of the float $b$ in the chamber B, so that the level of the liquid both in the chamber B and in the boiler D can be brought to the exact required position. An important detail of construction lies in the relatively large dimensions of the valve $a$ and float $b$ for the purpose of allowing no sensible variation of level to take place when liquid is drawn from the apparatus. Another feature to be noted are the pointers 17 and 18, connected to the plugs of the cocks $d\ u$, which indicate upon corresponding dials the respective angular position of the openings of the said plugs in the respective cocks.

The arrangement by which the thermal insulation of the cocks $d\ u$ and the mixing-chamber F is obtained comprises insulating-blocks M N, connected to the chamber F' by narrow strips of metal in such a manner that the air is allowed to freely circulate around the chamber F'.

As a detail for the good working of the apparatus it is to be noted that the exits $q$ and $q'$ must be fixed and maintained to a pre-established level in respect of the whole apparatus, as a variation of their position may affect the pressure of the liquid in the pipes, and consequently its temperature.

What I claim, and desire to secure by Letters Patent, is—

1. In apparatus for drawing liquid at any desired temperature, the combination with means for heating a part of the liquid and mixing it with an unheated portion, of a temperature-indicating device comprising a scale and pointer, the scale having a series of isothermal lines and the position of the pointer being adjustable with respect to the scale to compensate for varying conditions of starting or the like.

2. In apparatus for drawing liquid at any desired temperature, the combination with means for heating a part of the liquid and mixing it with the unheated portion, of a controlling and indicating device comprising a scale-plate and a pointer, the scale having a series of isothermal lines crossing obliquely the path of the pointer and the pointer being adjustable in a direction transverse to its path of movement to compensate for variations in the temperature of the liquid before heating.

3. In apparatus for drawing liquid at any desired temperature, the combination with a source of supply A, of a pair of branches 2 and 3, means for heating the part of the liquid passing through the branch 3 and mixing it in varying proportions with the unheated portion passing through the branch 2, and means for maintaining a constant pressure on the liquid in the two branches.

4. In apparatus for drawing liquid at any desired temperature, the combination with a source of supply A, of a pair of branches 2 and 3, means for heating the part of the liquid passing through the branch 3 and mixing it in varying proportions with the unheated portion passing through the branch 2, means for automatically controlling the heat applied to the liquid in the branch 3, and means for maintaining a constant pressure on the liquid in the two branches.

5. In apparatus for drawing liquid at any desired temperature, means for heating a part of the liquid and mixing it with the unheated portion, including pipes 2 and 4 for conducting the unheated and the heated liquid to the point at which they are mixed, cocks in said pipes controlling the supply of unheated or heated liquid, a dial and pointer carried upon each cock for indicating the relative positions of the two cocks, and means for maintaining an equal pressure upon the heated and unheated portions.

6. In apparatus for drawing liquid at any desired temperature, the combination with means for heating a part of the liquid and mixing it with the unheated portion, of a device for indicating the temperature of the liquid drawn and comprising a scale-plate and a pointer, said pointer being movable transversely over said plate to indicate variations in temperature and being composed of two parts connected by a rack and pinion so as to permit an adjustment of the length of the pointer to bring its end over different parts of the scale-plate.

7. In apparatus for drawing liquid at any desired temperature, the combination with means for heating a part of the liquid and mixing it with the unheated portion, of a device for indicating the temperature of the liquid drawn and comprising a scale-plate and a pointer, the scale-plate having a series of rack-teeth and the pointer carrying a pinion engaging said rack-teeth by means of which the pointer may be moved across the scale-plate.

In testimony whereof I affix my signature in presence of two witnesses.

MARCO TREVES.

Witnesses:
　HUGO PIZZOTTI,
　MARIO CAPUCCIO.